(12) United States Patent
Duvall et al.

(10) Patent No.: US 10,260,589 B2
(45) Date of Patent: Apr. 16, 2019

(54) GAS STRUT

(71) Applicant: GM Global Technology Operations LLC, Detroit, MI (US)

(72) Inventors: Jacob Duvall, Royal Oak, MI (US); Himanshu H. Mehta, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/648,587

(22) Filed: Jul. 13, 2017

(65) Prior Publication Data
US 2019/0017563 A1    Jan. 17, 2019

(51) Int. Cl.
| | |
|---|---|
| *F16F 9/02* | (2006.01) |
| *F16F 9/36* | (2006.01) |
| *B60J 5/10* | (2006.01) |
| *F16F 9/32* | (2006.01) |
| *F16J 15/3296* | (2016.01) |

(52) U.S. Cl.
CPC .......... *F16F 9/0218* (2013.01); *F16F 9/0281* (2013.01); *F16F 9/366* (2013.01); *B60J 5/10* (2013.01); *F16F 9/3228* (2013.01); *F16F 9/362* (2013.01); *F16F 2222/126* (2013.01); *F16F 2228/001* (2013.01); *F16F 2230/0023* (2013.01); *F16J 15/3296* (2013.01)

(58) Field of Classification Search
CPC .......... F16F 9/02; F16F 9/0218; F16F 9/0281; F16F 9/3228; F16F 9/3242; F16F 9/36; F16F 9/361; F16F 9/362; F16F 9/366; F16F 2222/126; F16F 2230/0023; F16F 2230/0047; F16J 15/3296

USPC .......... 188/322.16, 322.17; 277/321
See application file for complete search history.

(56) References Cited

U.S. PATENT DOCUMENTS

| | | | | |
|---|---|---|---|---|
| 4,103,900 | A * | 8/1978 | Wittersheim | B65D 49/12 215/256 |
| 5,485,987 | A * | 1/1996 | Jobelius | F16F 9/0218 188/322.17 |
| 5,735,371 | A * | 4/1998 | Jobelius | F16F 9/0218 188/276 |
| 6,338,906 | B1 * | 1/2002 | Ritland | B01D 29/111 428/539.5 |
| 2008/0296016 | A1 * | 12/2008 | Hughes | E21B 33/085 166/250.01 |
| 2012/0267858 | A1 * | 10/2012 | Rust | F16J 15/064 277/321 |
| 2016/0178064 | A1 * | 6/2016 | Vatovec | F16J 15/3296 244/100 R |

FOREIGN PATENT DOCUMENTS

DE    102006036264 A1 *  2/2008  .......... F16F 9/0218

* cited by examiner

*Primary Examiner* — Thomas J Williams
(74) *Attorney, Agent, or Firm* — Cantor Colburn LLP

(57) ABSTRACT

A gas strut includes a housing, a rod, and a seal. The rod extends along a centerline and is spaced radially inward from the housing to axially move between a retracted position and an extended position with respect to the housing. The seal includes an outer portion engaged to the housing, an inner portion in sliding contact with the rod, and a mid-portion spanning between and engaged to the inner portion and the outer portion during normal operation. The mid-portion is constructed and arranged to break after about a predetermined number of gas strut actuations.

18 Claims, 3 Drawing Sheets

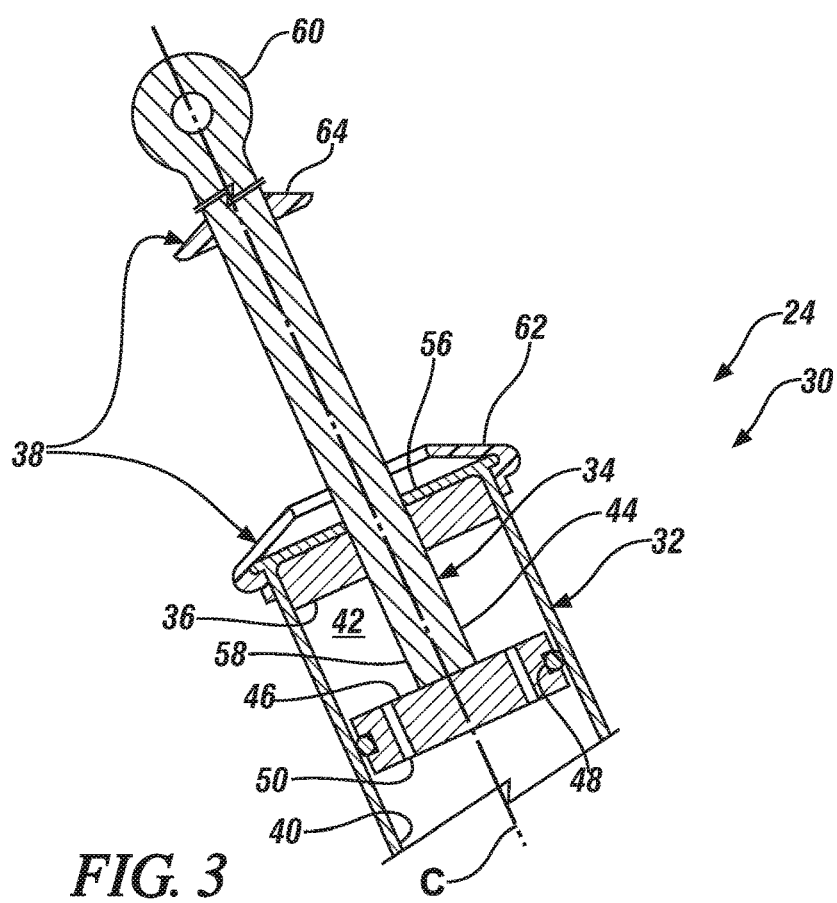
FIG. 3
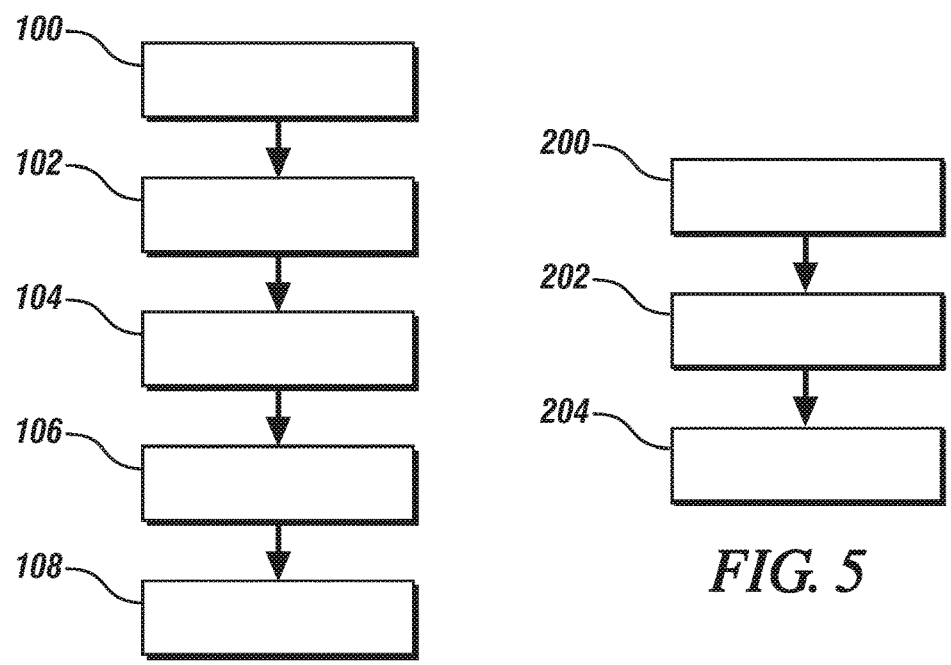
FIG. 4
FIG. 5

GAS STRUT

INTRODUCTION

The subject disclosure relates to gas struts, and more particularly, to gas strut wear indicators.

Gas struts are known to include a piston assembly that reciprocates within a pressure chamber defined by a housing. Typically, the pressure chamber contains an inert gas such as nitrogen. The piston assembly includes an enlarged head that slides within the housing, and a rod that extends from the head and out through one end of the housing. In operation, as the rod retracts within the housing, the total volume of the pressure chamber is reduced thus increasing the gas pressure within the chamber. The piston head may include valves or openings that communicate axially through the piston head to control and establish pressure equilibrium on both sides of the piston head regardless of the axial location of the head during a strut cycle. Because the surface area on a leading side of the piston head is larger than a surface area of the other side (i.e., the side that the rod attaches to), axial forces may not be equivalent. Therefore, as pressure increases within the pressure chamber as the strut retracts, a force that resists the retraction increases tending to bias the strut toward a fully extended position.

Regardless of gas strut position, the positive gas pressure within the gas strut is maintained or preserved via a seal that sealably slides against the reciprocating piston rod. As the seal wears, or through other components that may wear or require maintenance over time, the gas pressure in the pressure chamber may decrease with increasing wear on the seal. For example, a twenty percent decrease in gas pressure may be significant in some applications, and if the degraded pressure condition is known, may lead to strut maintenance or replacement. Unfortunately, known means to determine degraded gas pressure conditions is limited and/or impractical.

Accordingly, a robust wear indicator for gas struts is desirable.

SUMMARY

A gas strut according to one, non-limiting, embodiment of the present disclosure includes a housing, a rod, and a seal. The rod extends along a centerline and is spaced radially inward from the housing to axially move between a retracted position and an extended position with respect to the housing. The seal includes an outer portion engaged to the housing, an inner portion in sliding contact with the rod, and a mid-portion spanning between and engaged to the inner portion and the outer portion during normal operation. The mid-portion is constructed and arranged to break after about a predetermined number of gas strut actuations.

Additionally to the foregoing embodiment, the seal is a dust boot.

In the alternative or additionally thereto, in the foregoing embodiment, the seal is resiliently flexible.

In the alternative or additionally thereto, in the foregoing embodiment, the seal is one unitary and homogeneous piece during normal operation, and two separate pieces upon breakage of the mid-portion.

In the alternative or additionally thereto, in the foregoing embodiment, the outer and inner portions are circumferentially continuous.

In the alternative or additionally thereto, in the foregoing embodiment, the mid-portion defines a circumferentially extending valley.

In the alternative or additionally thereto, in the foregoing embodiment, the predetermined number of gas strut actuations is associated with about a twenty percent loss of gas strut pressure.

In the alternative or additionally thereto, in the foregoing embodiment, the seal is made of an elastomer.

In the alternative or additionally thereto, in the foregoing embodiment, the seal is a dust boot manufactured as one unitary and homogeneous piece made of an elastomer.

In the alternative or additionally thereto, in the foregoing embodiment, the inner portion is spaced axially from the outer portion when the rod is in the extended position and the mid-portion is broken.

In the alternative or additionally thereto, in the foregoing embodiment, the inner portion is in circumferentially continuous and resilient contact with the rod.

A method of operating a gas strut according to another, non-limiting, embodiment includes actuating the gas strut during normal operation and for an approximate predetermined number of actuations. Once a predetermined number of actuations occur, fatigue failure of a seal may be achieved. The fatigue failure causes at least a portion of the seal to be carried with the rod assembly thereby spacing a housing away from the portion. The spacing of the portion provides a visual indication that the seal has failed.

Additionally to the foregoing embodiment, each actuation is the movement of a rod assembly from a retracted position, to an extended position, and back to the retracted position for each actuation.

In the alternative or additionally thereto, in the foregoing embodiment, the seal is a dust boot.

In the alternative or additionally thereto, in the foregoing embodiment, the method includes repeatedly actuating the gas strut during design testing, counting the actuations, measuring a gas pressure within the gas strut during the repeated actuations, ceasing the repeated actuations when a predetermined gas pressure loss is achieved, noting the total number of actuations as a predetermined number of actuations, and designing the seal to achieve the fatigue failure when the predetermined number of actuations is achieved.

In the alternative or additionally thereto, in the foregoing embodiment, each actuation amounts to moving the rod assembly from the retracted position, to the extended position, and back to the retracted position.

In the alternative or additionally thereto, in the foregoing embodiment, the predetermined gas pressure loss is about twenty percent.

In the alternative or additionally thereto, in the foregoing embodiment, the predetermined number of actuations is about twenty-five thousand.

In the alternative or additionally thereto, in the foregoing embodiment, the predetermined gas pressure loss is approximately associated with the predetermined number of actuations.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 3 is a partial cross section of the gas strut assembly in an extended position and with a seal of the gas strut in a broken state.

FIG. 4 is a method of operating the gas strut assembly during the design of the seal; and FIG. 5 is a method of operating the gas strut assembly during normal operation.

DETAILED DESCRIPTION

Figure 1:
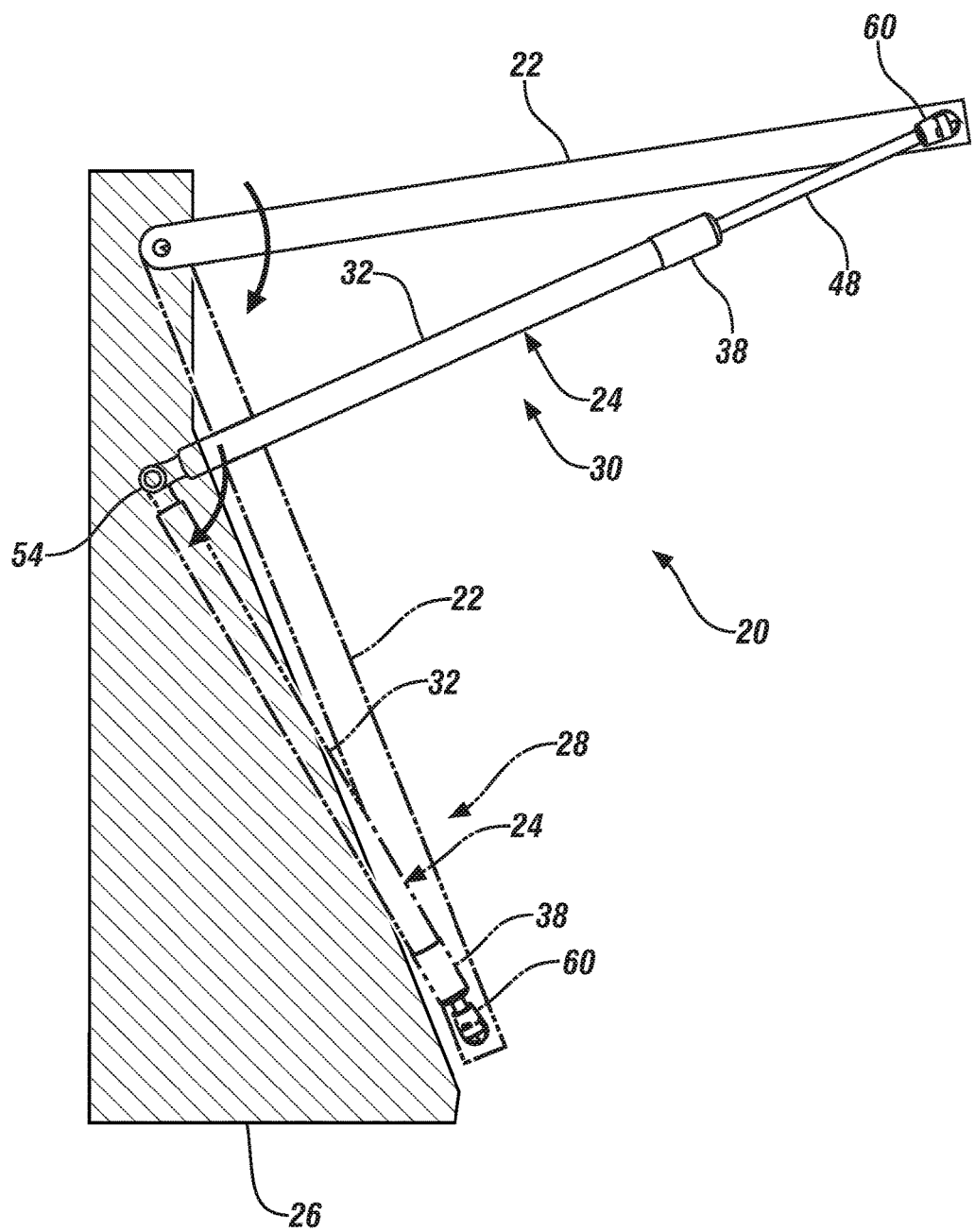
FIG. 1 is a schematic of a gas strut assembly utilized with a vehicle liftgate.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 illustrates a gas strut assembly 20 that may be applied to a vehicle, and more specifically, to a vehicle liftgate 22. In this application, the gas strut assembly 20 may include a gas strut 24, at least a portion of the vehicle liftgate 22, and at least a portion of a vehicle frame 26. The gas strut 24 may extend between and may be pivotally engaged to the liftgate 22 and the vehicle frame 26. The gas strut 24 facilitates the lifting, and thus opening, of the liftgate 22 as the gas strut 24 pivotally moves from a retracted position 28 (i.e., illustrated in ghost) to an extended position 30. In this and/or other applications, the gas strut 24 may be a gas spring, a gas damper, a shock absorber, and other similar embodiments.

Figure 2:
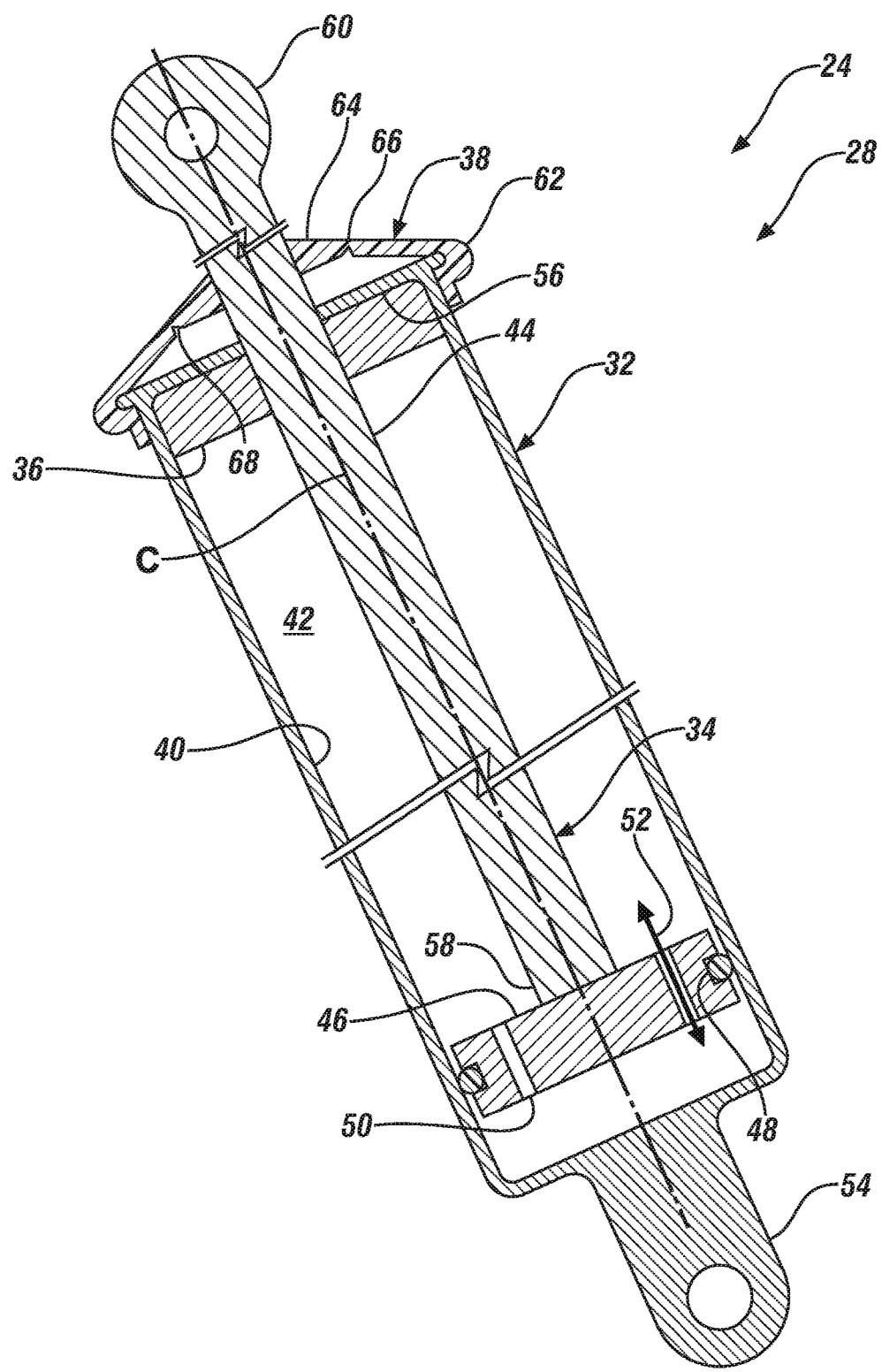
FIG. 2 is a cross section of a gas strut of the gas strut assembly in a retracted position.

Referring to FIG. 2, the gas strut 24 is illustrated in the retracted position 28, and may include a housing 32 that may be a cylinder, a piston assembly 34, a first seal 36, and a second seal 38. The piston assembly 34 reciprocates along a centerline C within the housing 32. The housing 32 includes an inner surface 40 that faces radially inward and may be cylindrical. The inner surface 40 defines, in-part, a cylinder chamber 42 for containment of a pressurized gas (e.g., nitrogen). The first seal 36 may be located in the chamber 42, may be annular in shape, and seals between the housing 32 and the piston assembly 34. In one embodiment, the seal 36 may include structural attributes to guide the reciprocating piston assembly 34 along the centerline C while preserving the gas pressure within the chamber.

The piston assembly 34 includes a rod 44 and a head 46 that may be radially enlarged with respect to the rod 44. The head 46 is adapted to reciprocate along an axial length of the chamber 42. The head 46 may include a seal 48 that may be an o-ring, and at least one opening or valve 50 that axially communicates through the head 46. In operation, the seal 48 sealably slides upon the inner surface 40 of the housing 32, and the gas (see arrow 52) that may be pressurized, controllably flows through the openings 50 from one side of the piston head 46 to the other as the piston assembly 34 reciprocates. Sizing of the opening 50 (or configuration of a valve) affects the dampening ability of the gas strut 24 as is typically known by one skilled in the art.

Referring to FIGS. 1 and 2, the housing 32 may further include a base end portion 54 that may be pivotally engaged to the vehicle frame 26, and an opposite working end portion 56 through which the rod 44 of the piston assembly 34 extends. The rod 44 may include a first end portion 58 located inside the housing 32 and attached to the piston head 46, and an opposite second end portion 60 located outside of the housing 32 and pivotally engaged to the liftgate 22. In another embodiment not illustrated, the end portion 60 of the rod 44 may be pivotally engaged to the vehicle frame 26, and the base end portion 54 of the housing 32 may be pivotally engaged to the liftgate 22.

The rod seal 36 is capable of maintaining a positive gas pressure of the gas 52 in the chamber 42, while sealably sliding against the rod 44 as the piston assembly 34 reciprocates between the retracted and extended positions 28, 30 (see FIG. 1). The rod seal 36 may be disposed in the chamber 42 proximate to the working end portion 56 of the housing 32. The working end portion 56 of the housing 32 may generally be an annular flange disposed substantially normal to the centerline C, and projecting radially inward from the inner surface 40. In one embodiment, the working end portion 56 may be an integral, unitary, part of the remaining portion(s) of the housing. The rod seal 36 may be axially adjacent to, and in contact with, the working end portion 56.

The seal 38 may be a dust boot, externally located with respect to the housing 32, and adapted to minimize exposure of, for example, the internal seal 36 to debris, dirt, and/or dust. The seal 38 may include a radially outer portion 62, an inner portion 64, and a mid-portion 66. The portions 62, 64, 66 may each be annular in shape and circumferentially continuous. The outer portion 62 may be attached to the working end portion 56 of the housing 32 (e.g., snap fitted or adhered). The inner portion 64 may be in biased, sliding, contact with the rod 44 of the piston assembly 34, and the mid-portion 64 spans radially between, and is engaged to, the outer and inner portion 62, 64. The mid-portion 66 may generally be thinner than the outer and inner portions 62, 64, thus making the mid-portion 66 more susceptible to fatigue failure. In one example, the mid-portion 66 may define a valley 68 In one embodiment, the seal 38 may be elastomeric, may be resiliently flexible, and may be made as one unitary and homogeneous piece. The seal or dust boot 38 may be made of a thermos plastic elastomer (TPE), a high density polyethylene (HDPE), and/or a plastic seal with over-molded rubber and/or santoprene.

Referring to FIGS. 2 and 3, the mid-portion 66 of the seal 38 may be designed to break after about a predetermined number of actuations of the gas strut 24. The breakage may occur via, for example, material fatigue and the shearing force created by the friction between the rod 44 and the inner portion 64 of the seal 38. A single actuation of the gas strut 24 may be the movement of the strut from the retracted position 28, to the extended position 30, and back to the retracted position 28. Through empirical testing during the design and/or testing of the gas strut assembly 20, the predetermined number of actuations may approximately, and directly, correlate to a predetermined gas pressure loss in the housing chamber 42. In one example, the predetermined gas pressure loss may be about twenty percent (20%), and the correlated predetermined number of actuations may be about twenty-five thousand (25,000) actuations.

Referring to FIG. 4, a method of operating the gas strut assembly 20 during the design, or design testing, of the seal or dust boot 38 is illustrated. At block 100, the gas strut is repeatedly cycled. Each cycle is the movement of the piston assembly 34 from the retracted position 28, to the extended position 30, and back to the retracted position 28. At block 102 the cycles are counted, and a gas pressure is measured in the housing chamber 42 during the repeated cycling. At block 104, the cycling is ceased when a predetermined gas pressure loss is achieved (e.g., about 20%). At block 106, the total number of cycles associated with the predetermined gas pressure loss is noted and becomes the predetermined number of cycles or actuations. At block 108, the seal 38 is designed to achieve fatigue failure at the predetermined number of cycles that directly correlates to the predetermined pressure loss.

Referring to FIG. 5, a method of operating the gas strut assembly 20 during normal use is illustrated. At block 200, the gas strut 24 is actuated until an approximate predetermined number of actuations occur. At block 202, the mid-portion 66 achieves fatigue failure at, for example, the valley 68. At block 204, the inner portion 64 of the seal 38 is carried by the rod 44 when the gas strut 24 moves from the retracted position 28 to the extended position 30, and while the outer portion 62 remains attached to the housing 32. The resulting axial spacing between the portions 62, 64 provides a clear, visual, indication that the gas strut 24 requires replacement due to gas pressure depletion.

Advantages and benefits of the present disclosure may include a visual notification to the user that gas strut service may be needed.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A gas strut comprising:
    a housing;
    a rod extending along a centerline, spaced radially inward from the housing, and constructed and arranged to axially move between a retracted position and an extended position with respect to the housing; and
    a seal including an outer portion engaged to the housing, an inner portion in sliding contact with the rod, and a mid-portion spanning between and engaged to the inner portion and the outer portion during normal operation, wherein the mid-portion is constructed and arranged to break after about a predetermined number of gas strut actuations, and wherein when the mid-portion is broken after the predetermined number of gas strut actions the inner portion is spaced axially from the outer portion when the rod is in the extended position to visually indicate that the seal has failed.

2. The gas strut set forth in claim 1, wherein the seal is a dust boot.

3. The gas strut set forth in claim 1, wherein the seal is resiliently flexible.

4. The gas strut set forth in claim 1, wherein the seal is one unitary and homogeneous piece during normal operation, and two separate pieces upon breakage of the mid-portion.

5. The gas strut set forth in claim 1, wherein the outer and inner portions are circumferentially continuous.

6. The gas strut set forth in claim 1, wherein the mid-portion defines a circumferentially extending valley.

7. The gas strut set forth in claim 1, wherein the inner portion is in circumferentially continuous and resilient contact with the rod.

8. The gas strut set forth in claim 1, wherein the seal is made of an elastomer.

9. The gas strut set forth in claim 1, wherein the seal is a dust boot manufactured as one unitary and homogeneous piece made of an elastomer.

10. A gas strut comprising:
    a housing;
    a rod extending along a centerline, spaced radially inward from the housing, and constructed and arranged to axially move between a retracted position and an extended position with respect to the housing;
    a seal including an outer portion engaged to the housing, an inner portion in sliding contact with the rod, and a mid-portion spanning between and engaged to the inner portion and the outer portion during normal operation, wherein the mid-portion is constructed and arranged to break after about a predetermined number of gas strut actuations; and
    wherein the predetermined number of gas strut actuations is associated with about a twenty percent loss of gas strut pressure.

11. A method of operating a gas strut comprising:
    actuating the gas strut during normal operation and for an approximate predetermined number of actuations;
    achieving fatigue failure of a seal once the predetermined number of actuations is approximately achieved; and
    carrying at least a portion of the seal with the rod assembly thereby spacing a housing away from the portion, wherein the spacing of the portion provides a visual indication that the seal has failed.

12. The method set forth in claim 11, wherein each actuation is the movement of a rod assembly from a retracted position, to an extended position, and back to the retracted position for each actuation.

13. The method set forth in claim 11, wherein the seal is a dust boot.

14. The method set forth in claim 11, further comprising:
    repeatedly actuating the gas strut during design testing;
    counting the actuations;
    measuring a gas pressure within the gas strut during the repeated actuations;
    ceasing the repeated actuations when a predetermined gas pressure loss is achieved;
    noting the total number of actuations as a predetermined number of actuations; and
    designing the seal to achieve the fatigue failure when the predetermined number of actuations is achieved.

15. The method set forth in claim 14, wherein each actuation amounts to moving the rod assembly from the retracted position, to the extended position, and back to the retracted position.

16. The method set forth in claim 14, wherein the predetermined gas pressure loss is about twenty percent.

17. The method set forth in claim 16, wherein the predetermined number of actuations is about twenty-five thousand.

18. The method set forth in claim 14, wherein the predetermined gas pressure loss is approximately associated with the predetermined number of actuations.

* * * * *